No. 650,447. Patented May 29, 1900.
F. H. BEALS.
MUSIC TYPE WRITER.
(Application filed June 5, 1899.)

(No Model.) 10 Sheets—Sheet 1.

No. 650,447. Patented May 29, 1900.
F. H. BEALS.
MUSIC TYPE WRITER.
(Application filed June 5, 1899.)

(No Model.) 10 Sheets—Sheet 5.

No. 650,447. Patented May 29, 1900.
F. H. BEALS.
MUSIC TYPE WRITER.
(Application filed June 5, 1899.)
(No Model.) 10 Sheets—Sheet 7.

No. 650,447. Patented May 29, 1900.
F. H. BEALS.
MUSIC TYPE WRITER.
(Application filed June 5, 1899.)
(No Model.) 10 Sheets—Sheet 9.

UNITED STATES PATENT OFFICE.

FRANK H. BEALS, OF WORCESTER, MASSACHUSETTS, ASSIGNOR TO HIMSELF AND CHARLES G. WASHBURN, OF SAME PLACE.

MUSIC TYPE-WRITER.

SPECIFICATION forming part of Letters Patent No. 650,447, dated May 29, 1900.

Application filed June 5, 1899. Serial No. 719,344. (No model.)

*To all whom it may concern:*

Be it known that I, FRANK H. BEALS, a citizen of the United States, residing at Worcester, in the county of Worcester and State of Massachusetts, have invented a new and useful Music Type-Writer, of which the following is a specification.

My invention relates to a machine which has been especially adapted for printing music.

The object of my present invention is to provide a strong, compact, efficient, and inexpensive type-writing machine, and while a machine embodying my invention is especially adapted for printing music certain novel features thereof may be employed with advantage in other classes of type-writing machines.

To these ends my invention consists of the parts and combinations of parts, as hereinafter described, and more particularly pointed out in the claims at the end of this specification.

In the accompanying ten sheets of drawings, Fig. 3 is a side view thereof. Fig. 5 is an enlarged plan view of a portion of the type-bars and key-levers which constitute the main printing mechanism. Fig. 8 is a transverse sectional view of the paper-carriage, taken on the line 8 8 of Fig. 7. Fig. 18 is a fragmentary view of one of the combs in which the type-bars are mounted and guided.

In printing musical compositions a large number of characters are sometimes employed. Many of these characters—for example, those indicating repeats, retards, time, &c.—may be employed comparatively rarely in any one musical composition, while characters indicating notes or rests of various lengths are repeated and employed with frequency.

If each of the characters employed in printing music should be given a separate type-bar and key-lever, the printing mechanism or type-basket of a music type-writing machine would necessarily be extremely large. On the other hand, it is desirable that a machine for printing music should be capacitated to print all characters desired and nothing should be left to be lettered or filled in by hand.

One of the especial objects of my present invention is therefore to provide a compact and simple machine having a comparatively-small keyboard and type-basket for printing the ordinary or frequently-employed characters and with a supplemental or secondary printing mechanism for printing those characters more rarely employed—that is to say, a type-writing machine constructed according to my invention preferably employs a main printing mechanism for printing the ordinary or frequently-employed characters and a normally-inactive supplemental printing mechanism arranged to be brought into operation to print the unusual or more rarely employed characters. In addition to this especial feature of novelty a type-writing machine constructed according to my invention comprises a specially-constructed paper-carriage having connections for producing an advance or feeding movement and for raising and lowering the same and with novel ribbon-feeding connections, as will be hereinafter more particularly pointed out.

Referring to the drawings and in detail, a type-writing machine constructed according to my invention, as herein illustrated, comprises a machine frame or casing 20, which may be carried by legs or supports 21. The rear side of the casing 20 is preferably closed by a hinged section or cover 22, and journaled inside the frame is a supply-roll 23, from which a supply or sheet of paper for the machine may be torn off, as desired.

The main printing mechanism of the machine preferably comprises type-bars 24, which are journaled in racks or combs 25 to strike at a common center or printing-point.

A series of key-levers 26 are journaled in combs near the front of the machine, and each key-lever is provided with a pin 27, extending down through a slot in the frame of the machine and having a spring 28 coiled thereon to hold said key-levers up in their normal position. The rear ends of the key-levers extend under and engage the type-bars, so that whenever a key-lever is depressed its type-bar will be raised or thrown up to the printing-point in a well-understood manner, and in practice I preferably arrange a buffer-spring 29, as shown most clearly in Fig. 6, in position to coöperate with each of the type-bars 24 to insure a prompt return of each type-bar to its normal position after the same has been operated. The main printing mechanism as thus constituted is preferably capacitated to print those characters which occur most frequently in musical compositions, while a supplemental or distinct printing mechanism is employed for printing the more rarely used characters. This supplemental printing mechanism may be arranged as follows: Extending up from the frame 20 of the machine are posts 30, carrying tracks or ways 31. Mounted on the tracks or ways 31 and adapted to be secured in its normal position thereon by means of set-screws 33 is a frame or carriage 32. The frame or carriage 32, as illustrated most clearly in Figs. 13 to 17, is provided with a central aperture or opening 36, which is normally arranged opposite the printing-point of the main printing mechanism. Movably mounted in the carriage 32 at each side of the opening 36 therein is a series of plungers 34, each plunger 34 being normally held in a retracted position by a spring 35. The plungers 34 at their rear ends are provided with those types or characters which are but seldom employed in musical compositions.

In order to print or take the impression of a character carried by one of the plungers 34, I preferably employ a hammer controlled from the keyboard of the machine.

Figure 1:
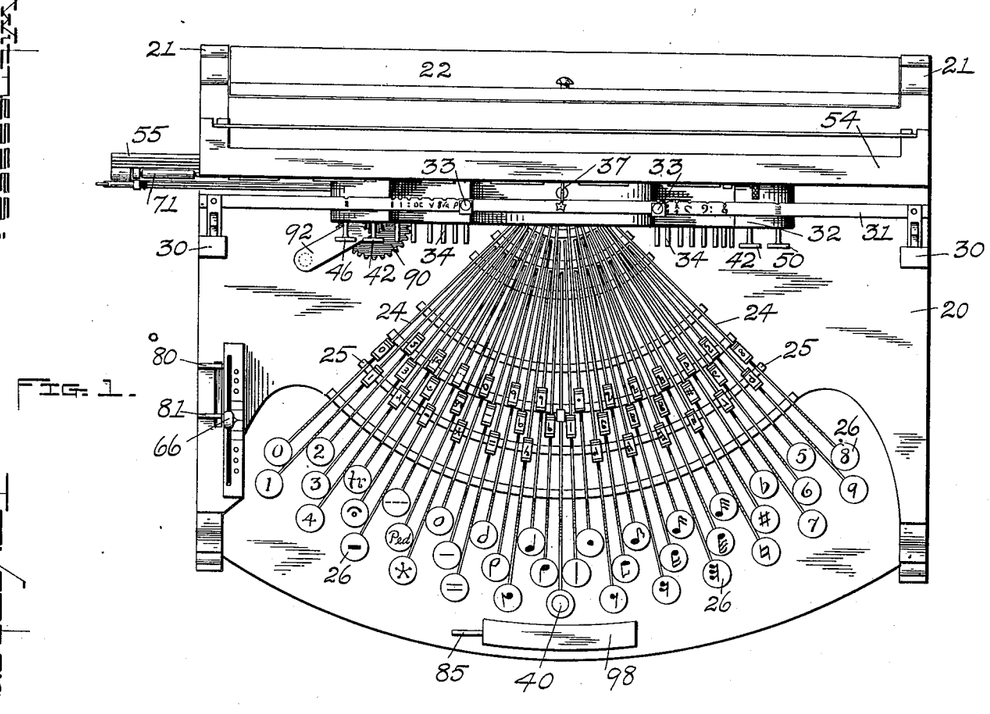
Figure 1 is a plan view of a type-writing machine constructed according to my invention.
Figure 2:
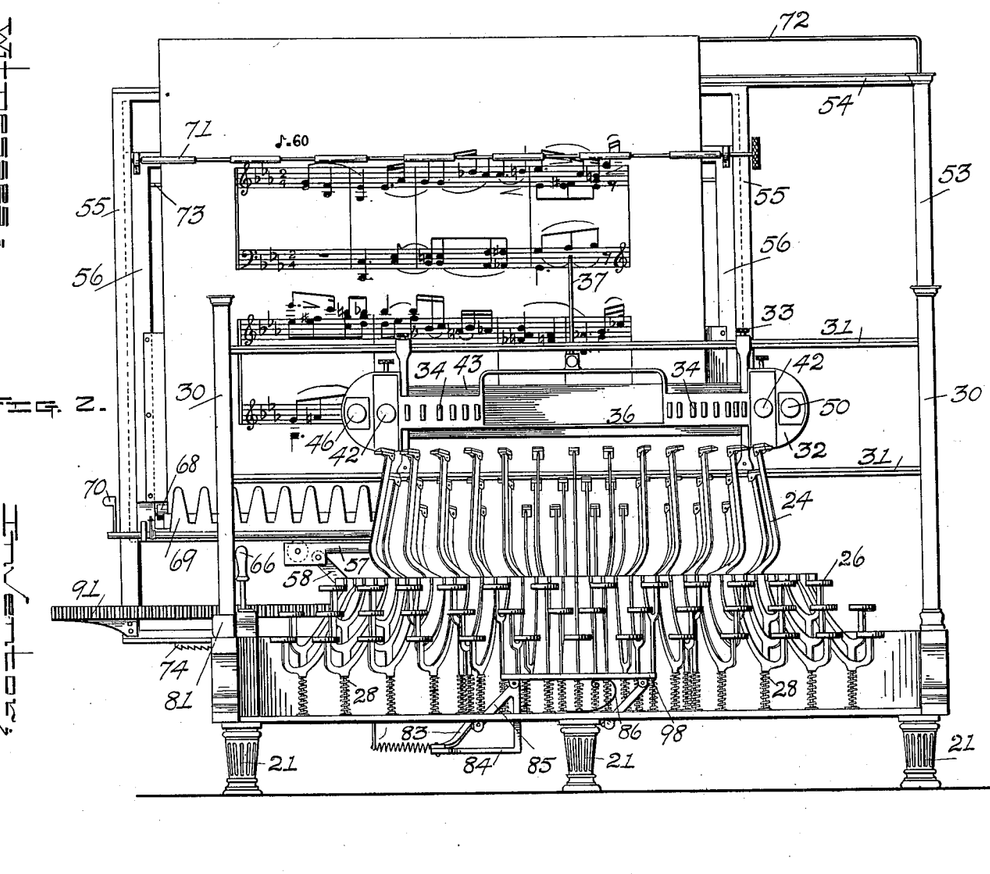
Fig. 2 is a front view thereof.
Figure 4:
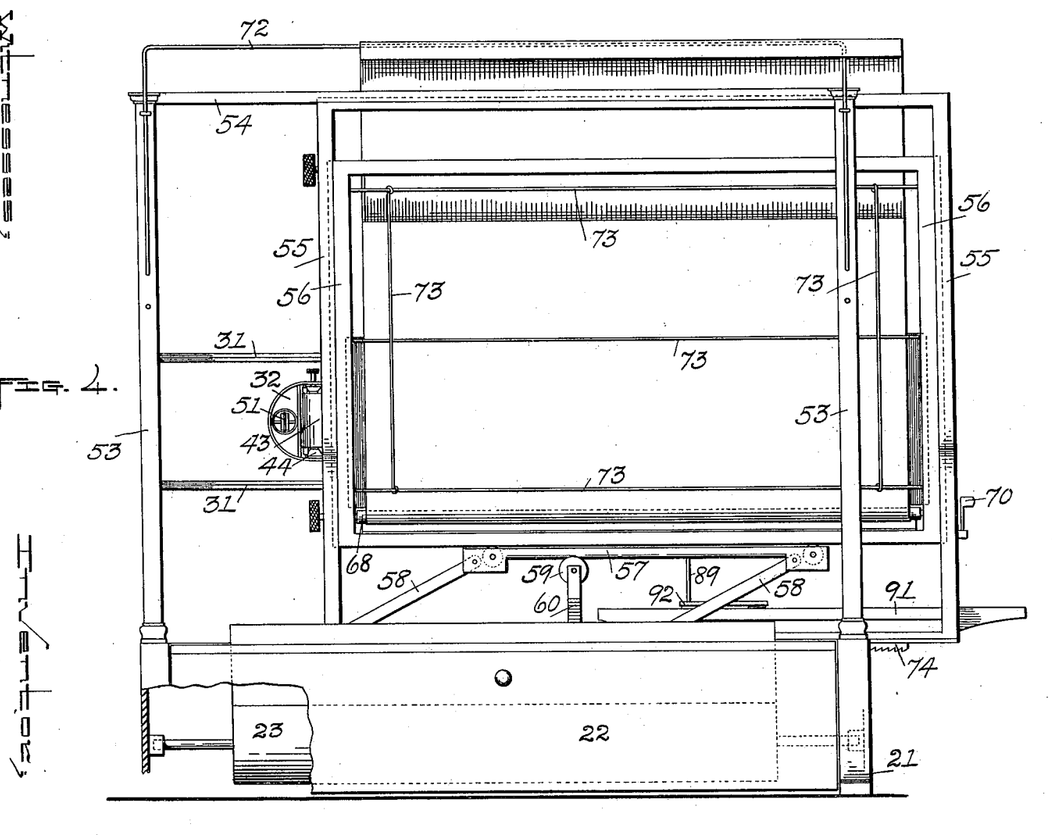
Fig. 4 is a rear view thereof, partly broken away.
Figure 6:
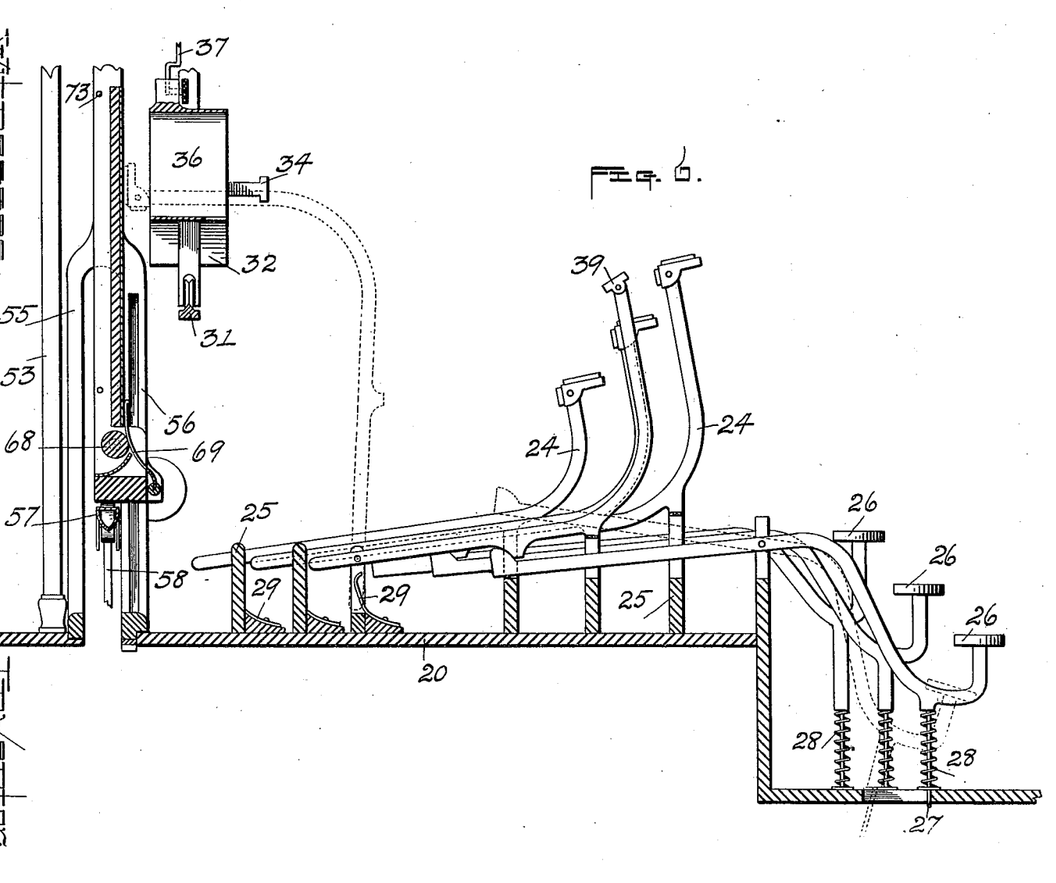
Fig. 6 is an enlarged central transverse sectional view of a portion of the machine.

As illustrated most clearly in Fig. 6, 39 designates a hammer, which may be of substantially the same construction as one of the type-bars of the main printing mechanism, and arranged to operate the hammer 39 is a central key-lever 40, as shown most clearly in Fig. 1. As also most clearly shown in Fig. 1, the upper track 31 is preferably graduated or provided with an index, and coöperating with the index on the track 31 is a pointer 37, extending up from the carriage 32. The pointer 37 when the carriage is in its normal position will serve to indicate to the operator the middle or printing point, and in practice the pointer 37 is made to perform still another function by being extended up high enough to serve as a guide for setting or adjusting the machine when music is being copied—that is to say, when a bar of music is to be duplicated by following the copy with the pointer the proper keys may then be struck to produce the desired copy.

In order to employ the supplemental printing mechanism to print a character, the set-screws 33 are first loosened, and the carriage is then moved to bring its pointer 37 opposite the desired character on the index on the track 31, and by then operating the central key-lever and hammer an impression of the desired character will be made at the printing-point of the machine. The carriage 32 is also preferably provided with an ink-ribbon 43, which is employed both in connection with the main printing mechanism of the machine and the supplemental printing devices thereof. The ribbon and its operating connections may be mounted in the carriage 32 in any desired manner.

Figure 13:
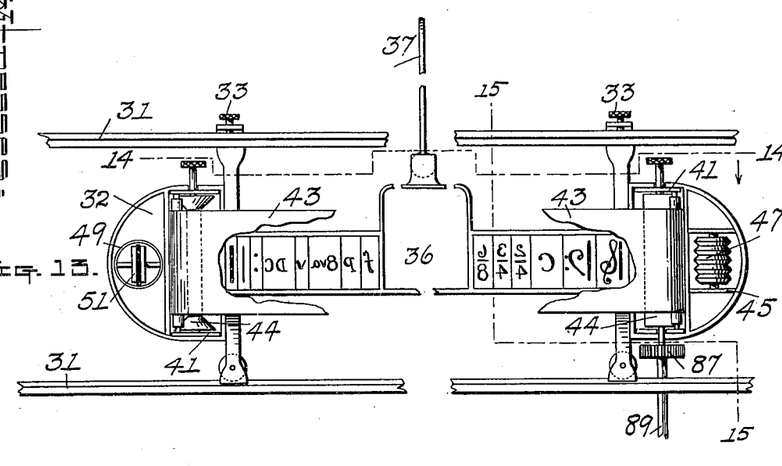
Fig. 13 is a rear view, partially broken away, of the carriage which constitutes the secondary printing mechanism.
Figure 14:
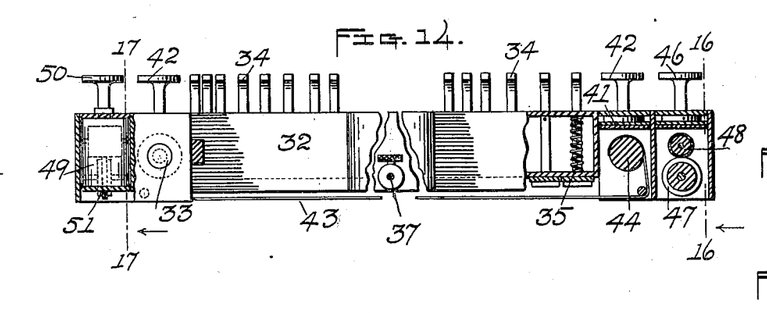
Fig. 14 is a plan view of the same, partially broken away.

As illustrated in Figs. 13 and 14, the carriage 32 is provided near its ends with movable casings 41, which may be moved into and out of position by finger-pieces 42. Removably journaled in the casings 41 are the ribbon-spools 44, one of said ribbon-spools being geared to feed or wind up the ribbon by means of connections hereinafter described. At the extreme ends of the carriage 32, outside of the ribbon-spools, I preferably employ ruling or marking wheels for ruling the straight lines which constitute the staff on which the music may be written and for ruling the vertical lines for dividing the music into measures or for ruling lines which may be inclined at different relative angles.

Figures 15, 16:
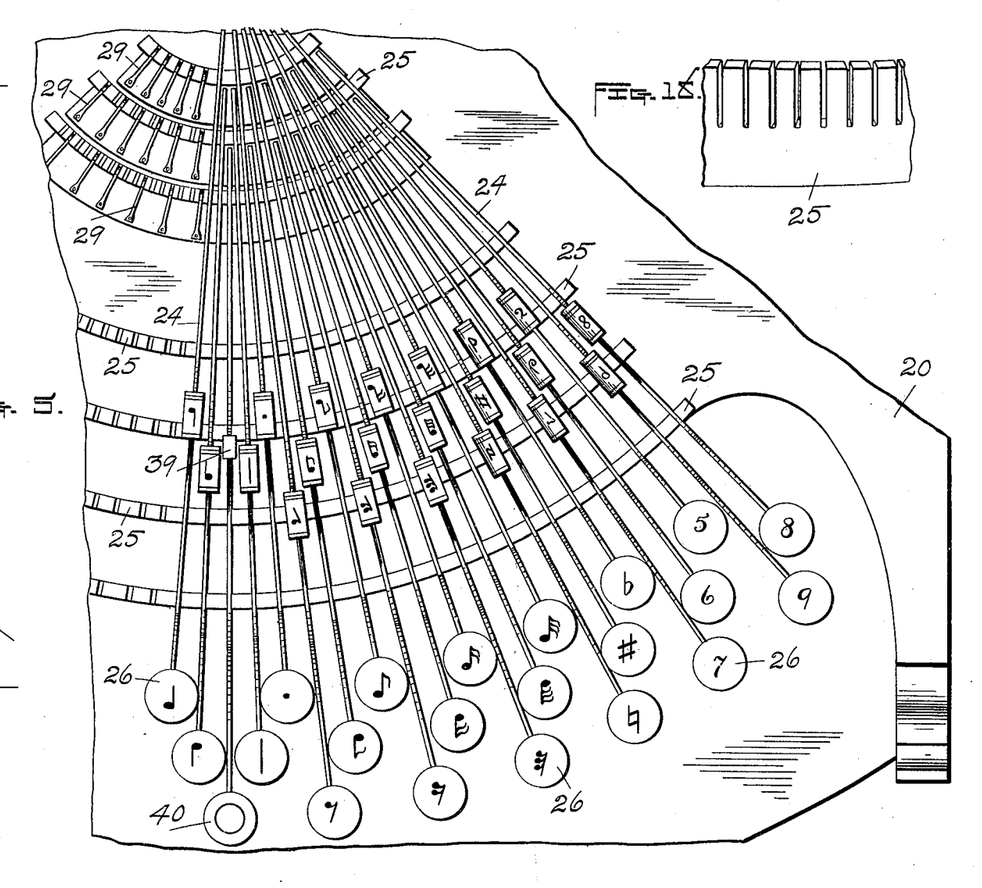
Fig. 15 is a sectional view taken on the line 15 15 of Fig. 13.
Figs. 16 and 17 are detail sectional views illustrating the ruling attachments which may be employed and are taken on the lines 16 16 and 17 17 of Fig. 14, respectively.
Figure 15:
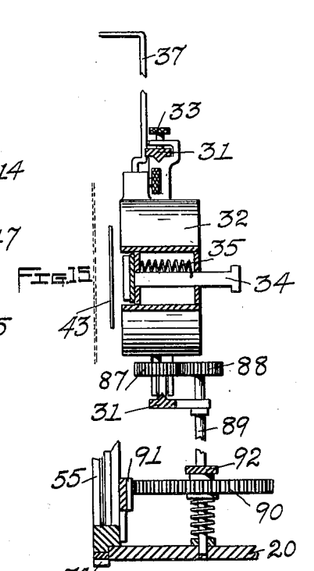
Figure 16:
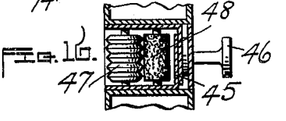
Figure 17:
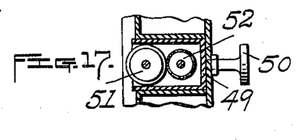

The ruling device for ruling the lines which form the staff on which the music is to be written comprises a casing 45, which may be moved or controlled by a key 46. Journaled in the casing 45 is a ruling-wheel 47, which is supplied with ink from an ink-roll 48. At the opposite end of the carriage 32 is a casing 49, having a ruling-wheel 51 journaled therein, which is supplied with ink from an ink-roll 52. The casing 49 is controlled by a finger-key 50 and may not only be pushed in to bring its ruling-wheel 51 into contact with the paper, but it may also be turned to bring the ruling-wheel to any desired inclination for ruling oblique or inclined lines.

Figure 12:
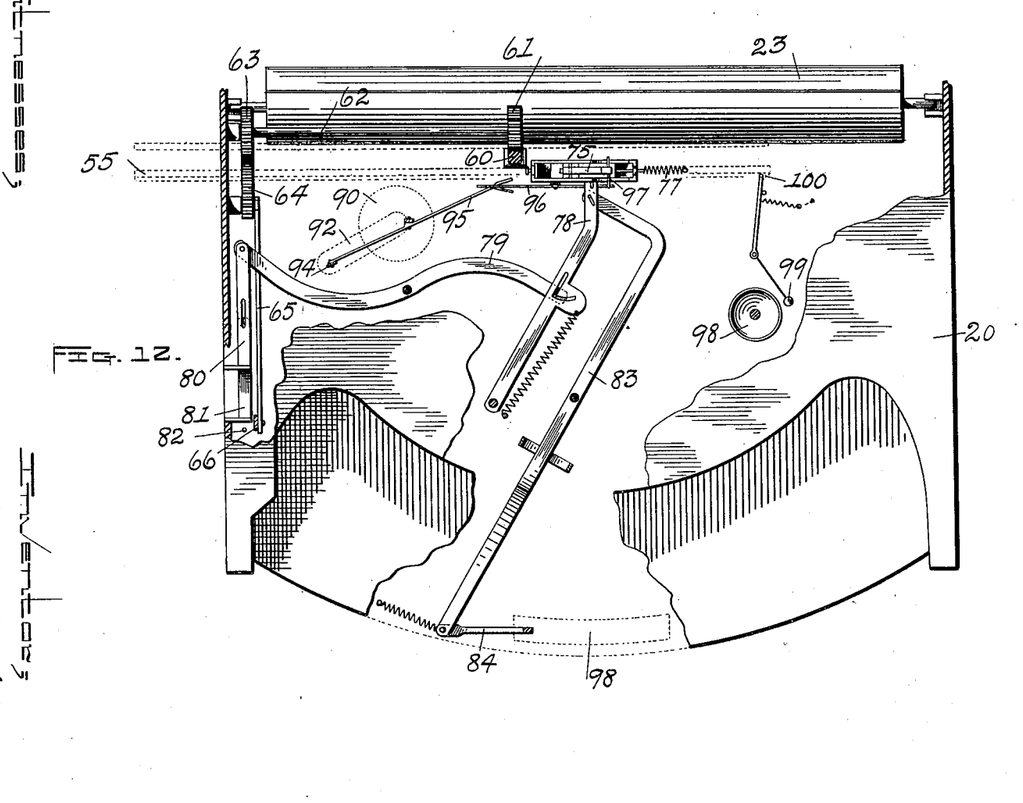
Fig. 12 is a plan view, partially broken away, illustrating the connections employed for feeding the carriage.

Extending up from the rear part of the frame of the machine are posts 53, carrying a track 54. Mounted to run on the track 54 and in ways in the frame of the machine is a main paper-carriage 55. (Most clearly illustrated in Figs. 7 and 8.) The main paper-carriage 55 consists, essentially, of a rectangular frame having arched or slotted end pieces, which may straddle the track which supports the secondary paper-carriage. Mounted in the main paper-carriage 55 is the secondary paper-carriage 56. The secondary paper-carriage 56 consists, essentially, of a rectangular plate of hard rubber or other material, over which the paper is stretched and forms a platen to support the paper while the same is being printed upon. The secondary carriage 56 rests upon and is supported by a track 57, as shown most clearly in Fig. 9. The track 57 is carried by links 58 and may be raised and lowered by connections from the keyboard of the machine. The connections for raising and lowering the track 57 are most clearly illustrated in Fig. 10. As shown in this figure, the track 57 rests upon and is supported by a roll 59, carried by a vertically-movable rack 60. Meshing with the rack 60 is a pinion 61, secured on a shaft 62. On the opposite end of the shaft 62, as shown most clearly in Fig. 12, is a gear 63, which meshes with and may be driven by a sector 64. Extending from the sector 64 is a link 65, which is connected to the lower end of an elevating-lever 66, as shown most clearly in Fig. 3. The elevating-lever 66 is provided with a pointer coöperating with an index-plate on the frame of the machine, as shown most clearly in Fig. 1, so that by shifting the elevating-lever 66 the paper-carriage may be raised and lowered and the desired character may be printed on any line of the staff desired.

Figure 7:
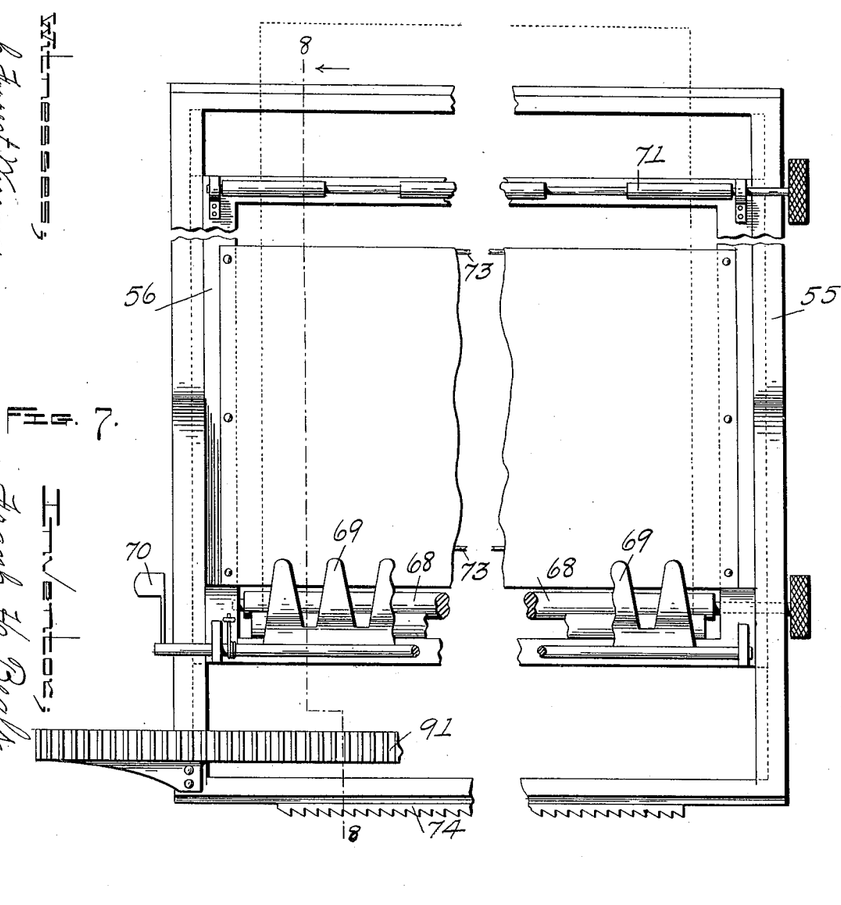
Fig. 7 is a partial front view of the paper-carriage.

The paper clamping and feeding devices may be of any of the usual or ordinary constructions. As herein illustrated, the secondary paper-carriage 56 is provided with a paper table or guide for directing a sheet of paper from the back side of the machine to the front of a feed-roll 68. Coöperating with the feed-roll 68 is a spring-pressed paper-clamp 69, which may be turned back when desired by a finger-piece 70, as shown in Fig. 71. From the paper-clamp 69 the paper may be passed up under a paper-roll 71, and the upper end of the paper may be turned back over a wire supporting-frame 72, carried by the posts 53.

The paper may be spaced for successive lines of music by means of the feed-rolls 68 and 71, and between these rolls it may be stretched tightly over the surface of the hard-rubber plate which forms the platen, so that the same will lie smoothly thereover to receive the impression from the type bars or characters mounted in the supplemental printing mechanism.

In order to hold the lower end of the sheet which is being printed out of the way, if desired, the lower end of the sheet may be turned up and held in place by a frame formed by wires 73.

The connections for feeding the carriage in order to produce the necessary spaces between successive characters and for feeding the ink-ribbon are most clearly illustrated in Figs. 7 to 11, inclusive. As shown in these figures, the main paper-carriage 55 is provided with a ratchet-toothed spacing-rack 74 and with a ribbon-feed rack 91. Meshing with and arranged to operate the spacing-rack 74 to advance the paper-carriage is a spring feed-pawl 75, which is pivotally mounted in a movable block 76. The block 76 is pulled back to its normal position by means of a spring 77, and the block may be advanced to feed forward the paper-carriage by a lever 78. (Shown most clearly in Fig. 12.) To operate the spacing-lever 78, I preferably provide a plurality of separate connections, which will operate to shift said lever 78 different relative distances in order to advance or move the paper-carriage ahead different amounts. As illustrated in Fig. 12, the spacing-lever 78 has a pin-and-slot connection with a lever 79, which extends to one side of the machine. The lever 79 is connected to a spacing-key 80, and connected to the spacing-key 80 by means of a pin-and-slot connection is a secondary spacing-key 81. The motion of the secondary spacing-key 81 is limited by a stop or pin 82. By means of this construction it will be seen that when the spacing-key 81 is operated a comparatively-small motion will be imparted to the spacing-lever 78; but when the spacing-key 80 is operated the motion may be continued, by reason of the pin-and-slot-connection with the spacing-key 81, even after said spacing-key 81 has engaged its stop 82, so as to impart a somewhat-greater motion to the spacing-lever 78, and hence secure a somewhat-greater motion or advance of the paper-carriage.

In addition to the two spacing-keys 80 and 81 I preferably employ a spacing-key 98, which may be located at the front of the keyboard in the ordinary position.

To operate the spacing-lever 78 from the space-key 98, I preferably employ a lever 83, having a pin-and-slot connection with the spacing-lever 78 at its rear end and connected at its front end to an arm 84, extending down from one of the links 85, which support the space-key 98.

The space-key 98 is normally held up by means of a spring 86, so that by depressing said space-key the lever 83 will be turned, and through its pin-and-slot connection it will turn the spacing-lever 78 to feed or advance the paper-carriage.

The distance or amount of feed secured by the spacing-key at the front of the keyboard may of course be equal to or greater than that secured by either one of the space-keys at the side of the machine, and, as shown most clearly in Fig. 12, the spacing-lever 78 is preferably slotted, so that when it is operated by means of the space-key at the front of the keyboard the lever 79, connected to the space-keys at the side of the machine, will not be affected.

Figure 9:
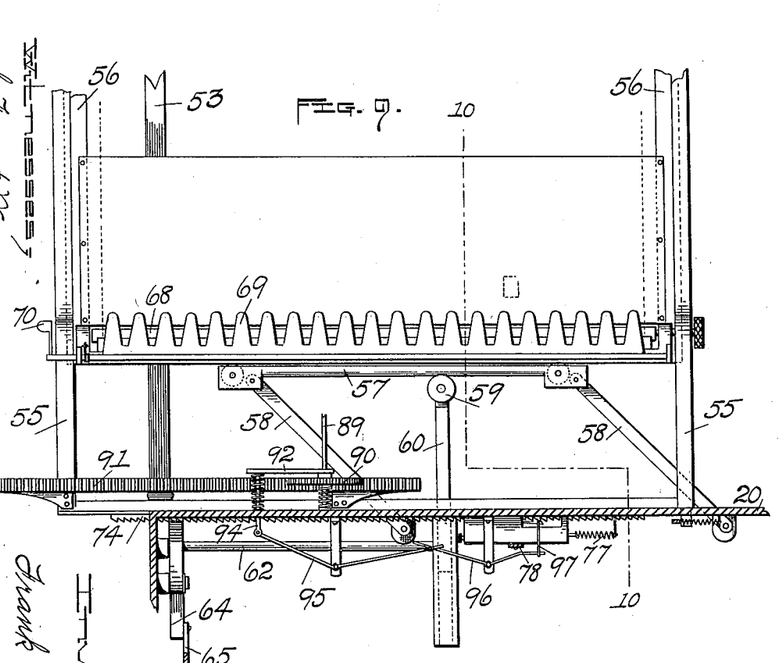
Fig. 9 is a detail view illustrating the spacing mechanism and the ribbon-feeding connections.
Figure 10:
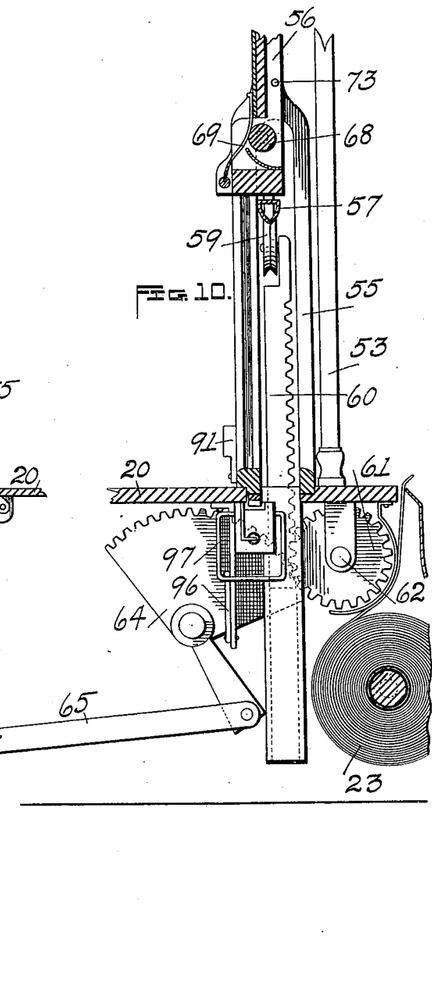
Fig. 10 is an enlarged transverse sectional view taken on the line 10 10 of Fig. 9, illustrating the connections employed for raising the secondary paper-carriage.
Figure 11:
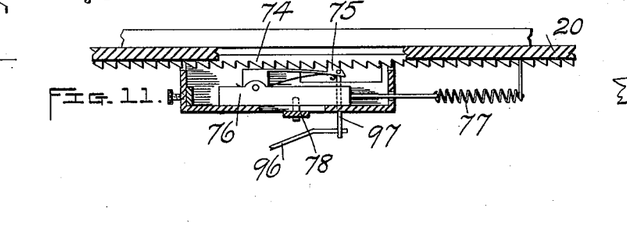
Fig. 11 is a sectional view illustrating the carriage-feeding pawl on an enlarged scale.

The ribbon-feeding and carriage-release connections are most clearly illustrated in Figs. 9 and 15. As shown most clearly in Fig. 15, the shaft of one of the ribbon-spools is provided with a gear 87, which meshes with and is driven by a gear 88, secured on the upper end of a vertically-movable shaft 89. Also secured on the shaft 89 is a gear 90, which meshes with and is driven by the ribbon-feed rack 91, carried by the paper-carriage. By means of this construction when the carriage is advanced the ribbon will be wound from one ribbon-spool onto the other, and in order to permit the paper-carriage to be moved back to its initial position I preferably provide connections for releasing the ribbon-feed and the spacing-pawl.

As illustrated, 92 is a releasing-key, which may be pushed down to move down the vertically-movable shaft 89, so as to throw the gears 87 and 88 out of mesh with each other to permit the paper-carriage to be moved back without affecting the ribbon-spools. Extending down from the release-key 92, as most clearly shown in Fig. 9, is a rod 94, which is connected at its lower end to a lever 95. The lever 95 connects with and operates a lever 96, which is connected by a link 97 to pull down the feed-pawl 75, so that by depressing the release-key the carriage may be freed both from its spacing connections and from the ribbon-feeding connections, so that the same will be free to be moved back to its initial position, as desired.

To indicate the approaching completion of a line, the machine may be provided with a bell 98, which may be sounded by a spring-striker 99, operated by a catch or pawl 100 on the carriage, as shown most clearly in Fig. 12.

By means of this construction it will be seen that I have provided a machine which may be of a comparatively-compact, simple, and inexpensive construction, which at the same time will be capacitated to print a great variety of different characters in any desired sequence or relation to each other.

The operation of the several devices constituting a type-writing machine constructed according to my invention have been so fully explained in describing the construction thereof that a description of the operation of the machine as a whole is not believed to be necessary.

I am aware that numerous changes may be made in the construction of my type-writing machine by those skilled in the art and that certain features of my machine may be applied to different classes of constructions from that herein shown and described. I do not wish, therefore, to be limited to the construction herein shown and described; but What I do claim, and desire to secure by Letters Patent of the United States, is—

1. In a type-writing machine, the combination of a main printing mechanism, a keyboard controlling the main printing mechanism to print ordinary or frequently-employed characters, a supplemental printing mechanism, and an index serving as a gage to bring any one of the characters of the supplemental printing mechanism to the printing-point, substantially as described.

2. In a type-writing machine, the combination of a main printing mechanism, a keyboard controlling the main printing mechanism, a movable carriage, carrying devices for printing the more rarely used characters, and an index serving as a gage to bring any desired one of said characters to the printing-point, substantially as described.

3. In a type-writing machine, the combination of a main printing mechanism, a keyboard controlling the main printing mechanism, a movable carriage arranged to be moved to present any one of a series of characters to the printing-point, an index serving as a gage therefor, and operating connections for printing an impression from the character thus presented, substantially as described.

4. In a type-writing machine, the combination of a main printing mechanism, a keyboard controlling the main printing mechanism, a movable carriage, an index serving as a gage for moving the carriage to present any one of a series of characters to the printing-point, a hammer, and a finger-key for operating said hammer to make an impression from the character thus presented, substantially as described.

5. In a type-writing machine, the combination of a main printing mechanism, a movable carriage, a series of spring-retracted character-carrying plungers mounted in said carriage, an index and pointer serving as a gage to bring any desired plunger to the printing-point, a hammer and a key-lever for operating said hammer to make an impression by means of the plunger presented to the printing-point, substantially as described.

6. In a type-writing machine, the combination of a main printing mechanism, a carriage mounted on ways and having a central opening to permit the action of the main printing mechanism when the carriage is in its normal position, set-screws for holding the carriage in its normal position, a plurality of spring-retracted character-carrying plungers mounted in said carriage, a pointer and index serving as a gage to present the desired plunger to the printing-point when the carriage is moved from its normal position, a hammer, and a key-lever for actuating the hammer to make an impression by means of the plunger presented to the printing-point, substantially as described.

7. In a type-writing machine, the combination of a plurality of type-bars arranged to print at a common center, key-levers connected to operate said type-bars, a supplemental printing mechanism, and an index serving as a gage for moving the supplemental printing mechanism to present any one of a series of rarely-used characters to the printing-point, substantially as described.

8. In a type-writing machine, the combination of a plurality of type-bars arranged to print at a common center, key-levers connected to operate said type-bars, a supplemental printing mechanism, an index arranged as a gage to move the supplemental printing mechanism to present any one of a series of rarely-used characters to the printing-point, a hammer, and a key-lever connected to operate said hammer to take an impression from the character thus presented, substantially as described.

9. In a type-writing machine, the combination of a plurality of type-bars arranged to print at a common center, key-levers connected to operate said type-bars, a carriage mounted on ways and having a central opening for the passage of the type-bars to the printing-point, means for holding the carriage in its normal position, a plurality of spring-retracted character-carrying plungers mounted in said carriage, an index and pointer for bringing any one of said characters to the printing-point when the carriage is moved from its normal position, a hammer, and a key-lever for operating said hammer to take an impression from the character thus presented, substantially as described.

10. In a music type-writing machine, the combination of a main printing mechanism, a supplemental printing mechanism for printing rarely-used characters, a main carriage, a vertically-movable secondary carriage mounted therein, connections for feeding the main carriage and for raising and lowering the secondary paper-carriage to different elevations so that the main printing mechanism or the supplemental printing mechanism may be operated to print musical characters in any desired sequence and relation to each other, substantially as described.

11. In a type-writing machine, the combination of a main carriage, a secondary paper-carriage vertically movable therein, and a track supporting said secondary carriage, said track being carried by parallel links so as to be vertically movable, substantially as described.

12. In a type-writing machine, the combination of a main carriage, a vertically-movable secondary carriage mounted therein, a track supporting said secondary carriage, parallel links carrying said track, a roller engaging said track, and connections for raising and lowering the roller to change the elevation of the secondary carriage, substantially as described.

13. In a type-writing machine, the combination of a main carriage, a vertically-movable secondary carriage mounted therein, a track for supporting said secondary carriage, and connections for raising and lowering said track, the end bars of the main carriage being arched or slotted to straddle said track, substantially as described.

14. In a type-writing machine, the combination of a main carriage, a vertically-movable secondary carriage mounted therein, a track carried by parallel links for supporting said secondary carriage, a rack having a roller at its upper end for raising and lowering said track, a gear meshing with said rack, a sector connected to turn the shaft on which said gear is mounted, and an elevating-lever connected by a link so as to raise or lower the secondary carriage to the desired position, substantially as described.

15. In a type-writing machine, the combination of the printing mechanism, a paper-carriage having a ribbon-feed rack and a spacing-rack, gearing operated from the ribbon-feed rack for winding a ribbon from one ribbon-spool to the other, feeding connections engaging the spacing-rack to advance the carriage, and a release-key and connections for simultaneously disengaging the spacing mechanism and ribbon-feeding connections, so that the paper-carriage may be returned to its initial position, substantially as described.

16. In a type-writing machine, the combination of the printing mechanism, a paper-carriage having a space-rack, and a ribbon-feed rack, gearing operated by the ribbon-feed rack for winding the ribbon from one ribbon-spool to the other, a spacing-pawl normally engaging the spacing-rack, connections for reciprocating the spacing-pawl to feed the carriage, and a releasing-key arranged to throw the ribbon-winding gearing out of mesh and to move the spacing-pawl out of engagement with the spacing-rack so that the carriage will be free to be moved back without affecting the spacing mechanism or ribbon-winding mechanism, substantially as described.

In testimony whereof I have hereunto set my hand in the presence of two subscribing witnesses.

FRANK H. BEALS.

Witnesses:
 LOUIS W. SOUTHGATE,
 PHILIP W. SOUTHGATE.